United States Patent
Kunieda

(10) Patent No.: US 8,849,035 B2
(45) Date of Patent: Sep. 30, 2014

(54) IMAGE PROCESSING APPARATUS IMAGE PROCESSING METHOD, AND CONTROL PROGRAM TO PERFORM FACE-DETECTION PROCESSING

(75) Inventor: Hiroyasu Kunieda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 12/791,164

(22) Filed: Jun. 1, 2010

(65) Prior Publication Data

US 2010/0329565 A1 Dec. 30, 2010

(30) Foreign Application Priority Data

Jun. 29, 2009 (JP) ................................. 2009-154068

(51) Int. Cl.
G06K 9/46 (2006.01)
G06K 9/00 (2006.01)

(52) U.S. Cl.
CPC ................. G06K 9/00228 (2013.01)
USPC ........................................................ 382/190

(58) Field of Classification Search
USPC ........................................................ 382/190
See application file for complete search history.

(56) References Cited

U.S. PATENT DOCUMENTS

| | | | |
|---|---|---|---|
| 7,620,242 B2 * | 11/2009 | Enomoto et al. ............... | 382/167 |
| 7,724,983 B2 * | 5/2010 | Lee ................ | 382/298 |
| 7,835,541 B2 * | 11/2010 | Lee et al. ...................... | 382/103 |
| 8,085,305 B2 * | 12/2011 | Kawaguchi et al. ........ | 348/208.4 |
| 8,116,536 B2 * | 2/2012 | Okada et al. ................... | 382/118 |
| 8,126,219 B2 * | 2/2012 | Fukuda .......................... | 382/118 |
| 8,155,397 B2 * | 4/2012 | Bigioi et al. .................. | 382/118 |
| 2006/0120604 A1 * | 6/2006 | Kim et al. ...................... | 382/181 |
| 2007/0036429 A1 * | 2/2007 | Terakawa ...................... | 382/159 |
| 2007/0172099 A1 * | 7/2007 | Park et al. ..................... | 382/118 |
| 2008/0309785 A1 * | 12/2008 | Sugimoto .................. | 348/222.1 |
| 2008/0310726 A1 | 12/2008 | Kawada | |
| 2009/0016639 A1 * | 1/2009 | Ueda .............................. | 382/275 |
| 2009/0323088 A1 | 12/2009 | Kunieda | |
| 2010/0209010 A1 | 8/2010 | Kato et al. | |
| 2013/0093943 A1 * | 4/2013 | Hongu et al. ................. | 348/349 |
| 2013/0215319 A1 * | 8/2013 | Tomita et al. ................. | 348/345 |

FOREIGN PATENT DOCUMENTS

| | | |
|---|---|---|
| JP | 2007-026308 A | 2/2007 |
| JP | 2007-165947 A | 6/2007 |
| JP | 2007-233517 | 9/2007 |
| JP | 2009-026299 | 2/2009 |
| JP | 2009-116400 A | 5/2009 |

OTHER PUBLICATIONS (ito, Machine Translation of JP2007165947, Jun. 28, 2007).*

* cited by examiner

Primary Examiner — Stephen R Koziol
Assistant Examiner — Totam Le
(74) Attorney, Agent, or Firm — Fitzpatrick, Cella, Harper & Scinto

(57) ABSTRACT

An image processing apparatus includes a detector to detect a face. The image processing apparatus sets a size of the face to be detected, changes a detection condition for face detection in accordance with the size of the face set, applies the detection condition changed to the detector, and detects the face from the image by use of the detector to which the detection condition is applied.

8 Claims, 16 Drawing Sheets

| FACE RATIO | DETECTOR ID | OCCURRENCE OF INCORRECT DETECTIONS |
|---|---|---|
| $Ra > Rf$ | Ver1 | QUITE RARE |
| $Rb > Rf$ AND $Ra \leqq Rf$ | Ver2 | RARE |
| $Rb \leqq Rf$ | Ver3 | USUAL |

FIG.10

IMAGE PROCESSING APPARATUS IMAGE PROCESSING METHOD, AND CONTROL PROGRAM TO PERFORM FACE-DETECTION PROCESSING

BACKGROUND OF THE INVENTION

1. Field of the Invention

The invention relates to an image processing apparatus to perform face-detection processing, an image processing method and a control program used for the same purpose.

2. Description of the Related Art

An image processing method to automatically detect a particular pattern of a subject from an image is useful for its application, for example, of determining human faces. Possible fields of application of the method are so broad as to include multimedia communication conferences, man-machine interfaces, security systems, monitoring systems to track human faces, and image compression techniques.

Methods as follows are used as such a technique to detect faces from images. For example, a method uses some of the distinctive features of human faces and the geometrical relations peculiar to the positions of such distinctive features. Another method, such as the template matching method, uses the symmetric features of human faces and/or the characteristic colors of human faces. There is even a human-face detection method that uses the neural network.

When the face of a subject person is detected from an image, the person does not always show his/her full face with his/her head upright. Images are taken, using a camera, from various directions and in various magnifications. So face-detection techniques have to handle faces taken from various angles and in various sizes in images. Accordingly, detection processings have to be repeated with small adjustments made in the angle of a detector, the size of detection area, and the position for the detection.

There are an enormous number of possible combinations of the detector angle and the detection-area size. If the detection processings have to cover all of these enormous combinations, it takes a long time to finish the processings. Various methods have been proposed to address this problem. Some of the proposed methods reduce the detection processes by limiting the area to be searched. For example, a method limits the searching area by limiting the angle and the size of the face on the basis of the result of the first detection (Japanese Patent Laid-Open No. 2007-233517). An other method limits the searching area by predicting the angle and the size of the face on the basis of the detection result of the first image in successively captured images (Japanese Patent Laid-Open No. 2009-026299).

Note that the method of Japanese Patent Laid-Open No. 2007-233517 limits the searching area on the basis of the result of the first detection. So, if the result of the first detection is incorrect, the area of the face cannot be detected correctly in the following detections. The method of Japanese Patent Laid-Open No. 2009-026299 is unable to limit the searching area if the target images are not taken successively. So, in this case, the processing time cannot be shortened. Under the circumstances, face-detection processing by an appropriate method which shortens the time for detection processing and which reduces the occurrence of incorrect detection is desirable.

SUMMARY OF THE INVENTION

The invention provides a fast-speed, well-modulated face-detection processing which detects faces of different sizes with different accuracies.

An image processing apparatus of the invention includes: setting unit for setting the size of the face to be detected; changing unit for changing detection conditions for face detection in accordance with the size of the face set; and detecting unit for applying the detection conditions changed to the detector and for detecting the face from the image by use of the detector to which the detection conditions are applied.

According to the invention, faces of different sizes are detected under different detection conditions. So, the face-detection processing of the invention is fast and well-modulated, and detects faces of different sizes with different accuracies.

Further features of the present invention will become apparent from the following description of exemplary embodiments (with reference to the attached drawings).

BRIEF DESCRIPTION OF THE DRAWINGS

FIG. 10 is a table to describe a case of selecting detectors according to the third embodiment;

DESCRIPTION OF THE EMBODIMENTS

Some preferred embodiments of the invention will be described below by referring to the accompanying drawings. What is described in the description of each embodiment below is one of the possible image processing apparatuses to determine whether there is or is not a face in the inputted image. To make the description of each embodiment simpler, it is assumed that if there is a face in the inputted image, the face is not rotated. Needless to say that the face can be detected in any direction by rotating the image and/or the detector.

Figure 16:
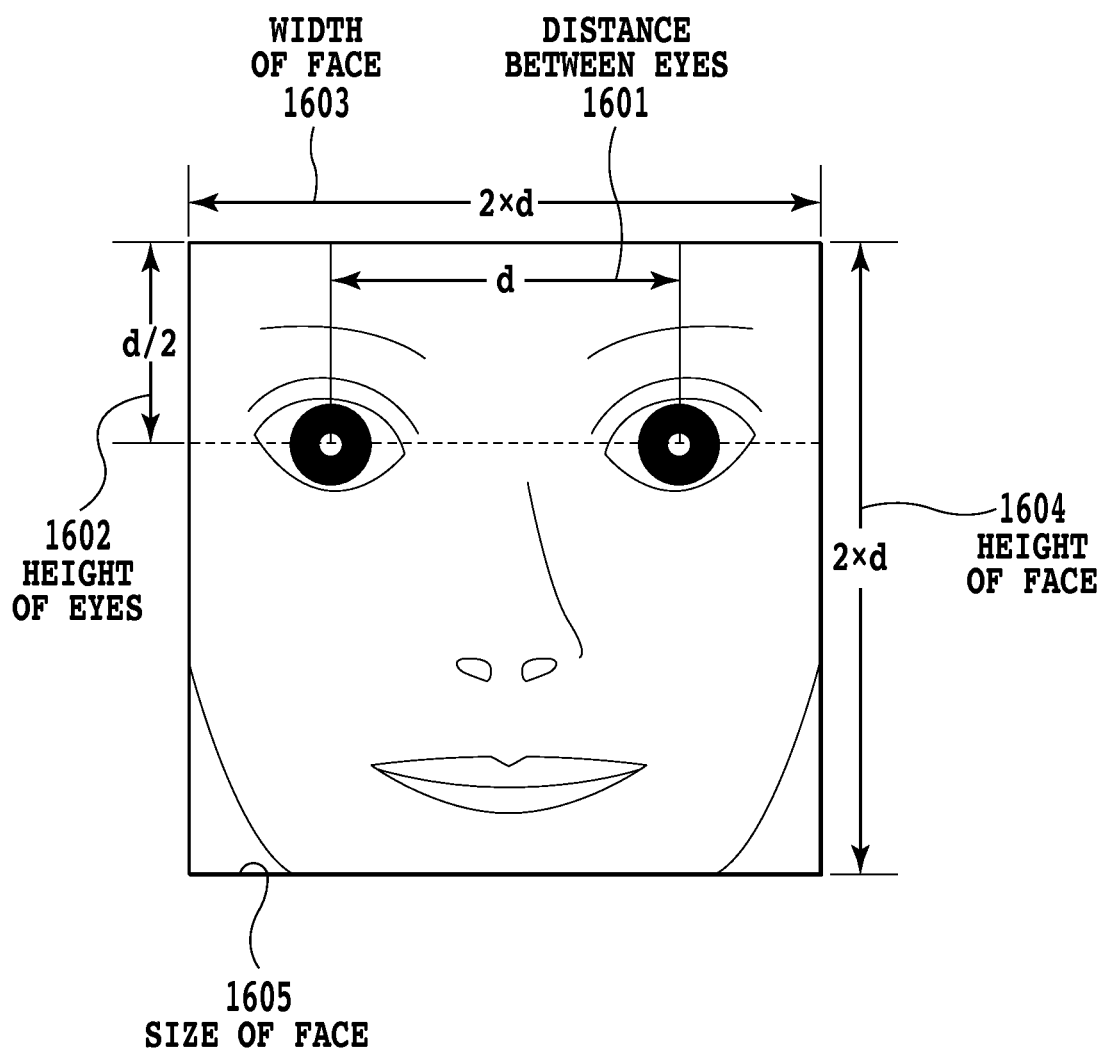
FIG. 16 is a view to describe the definitions of various terms related to the face to be detected.

The size of the face to be detected is defined as shown in FIG. 16. A distance 1601 is the distance between the two eyes. To be more specific, d denotes the distance between the centers of the pupils. A distance 1602 is the height of the eyes. The height 1602 of the eyes is half the distance 1601 between the two eyes (i.e., the distance 1602=d/2). A distance 1603 is the width of the face. The width 1603 of the face is twice as long as the distance 1601 between the two eyes (i.e., the distance 1603=2×d). To define the width 1603 of the face, a first line is drawn so as to connect the two eyes to each other, and a second line that is parallel to the first line is drawn at a position above the eye level by a distance equal to the height 1602 of the eye. Then, the width 1603 of the face is measured on the second line. A distance 1604 is the height of the face. The height 1604 of the face is as long as the width 1603 of the face (i.e., the height 1604=2×d). The height 1604 of the face is measured on a line that is perpendicular to the width 1603 of the face. An area 1605 is the size of the face. The size 1605 of the face corresponds to the area demarcated by the lines of the width 1603 of the face and the lines of the height 1604 of the face. In the following description of the embodiments, the size 1605 of the face is defined to be the size of the face to be detected (also referred to simply as the "detection face size"). The face shown in FIG. 16 shows his/her front face. It is of course possible to define the detection face size in a similar manner even if the face is obliquely directed at a predetermined angle.

First Embodiment

The apparatus to be described in the first embodiment is an apparatus to detect faces as follows. The apparatus converts a detector so as to fit the size of the face to be detected, and changes the detection conditions so as to fit the size of the face to be detected. Then, the apparatus uses the resultant detector and detection conditions when the apparatus detects faces.

Figure 1:
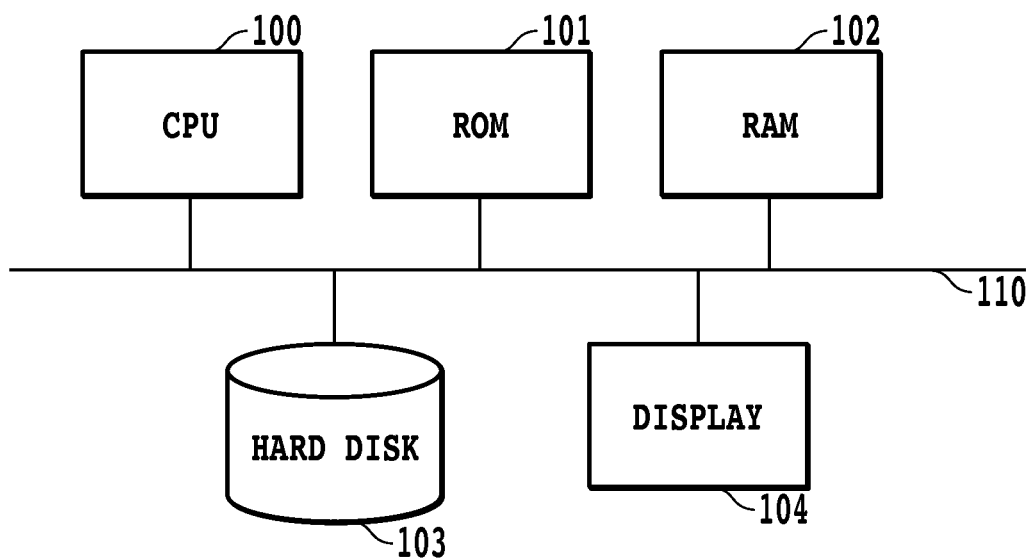
FIG. 1 is a block diagram illustrating a hardware configuration example of an image processing apparatus according to a first embodiment.

FIG. 1 is a block diagram illustrating a hardware configuration example of an image processing apparatus according to the first embodiment. In FIG. 1, a CPU (central processing unit) 100 executes a program that has been temporarily loaded to a RAM 102. Thus, the processes of the flowcharts described in the first embodiment will be executed. A ROM 101 stores a program that the CPU 100 executes. The RAM 102 is a memory where various data are temporarily stored when the CPU 100 executes the program. A hard disk 103 is a storage medium to store image files and detection parameters for pattern classification which are used when faces are detected. A display 104 shows the user the results of processing of this embodiment. A control bus/data bus 110 connects the CPU 100 to each of the above-mentioned units 101 to 104.

The image processing apparatus with the above-described configuration executes a series of processes to detect faces. The overall flow of the face-detection processing will be described below by referring to the flowchart shown in FIG. 2. Firstly, at step S201, the CPU 100 loads image data from the hard disk 103, and loads the image data in the RAM 102. In the RAM 102, the image data are held as two-dimensional array. At the subsequent step S202, the CPU 100 loads detection parameters from either the hard disk 103 or the ROM 101 to the RAM 102. The above-mentioned detection parameters include analysis patterns to be used in the face-detection algorithm. At step S203, the CPU 100 determines whether there is or is not a face in the image reproduced from the image data that have been loaded at step S201. To this end, the CPU 100 uses the detection parameters that have been loaded at step S202. The processing of detecting faces at step S203 is one of the characteristic parts of the invention, and will be described in detail later. At the subsequent step S204, the CPU 100 makes the display 104 show the result of the face detection performed at step S203.

Figure 12:
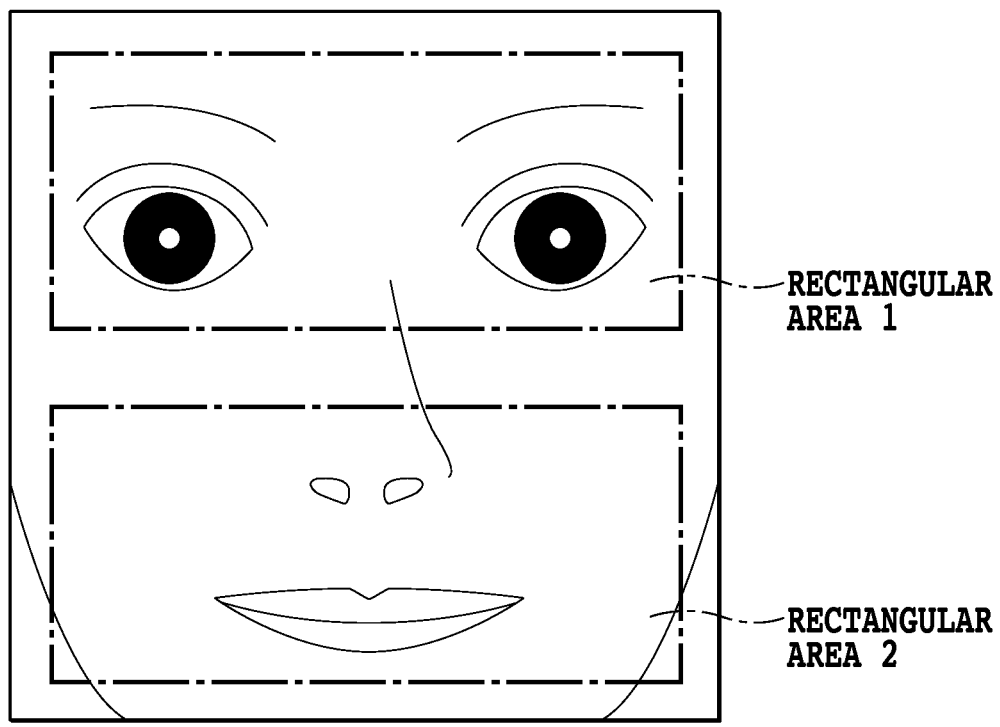
FIG. 12 is a view to describe a case where a rectangular area to be analyzed is set within a weak discrimination.
Figure 13:
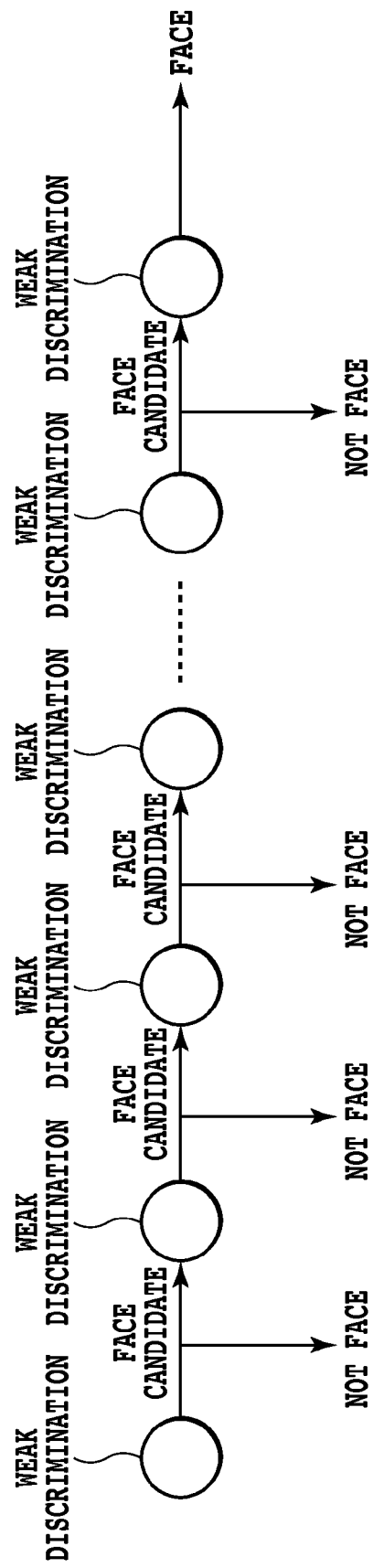
FIG. 13 is a diagram to describe a case where a strong discrimination is formed by connecting, in series, plural weak discriminations.

The description that follows is based on a case where AdaBoost, which is a well-known algorithm to those skilled in the art, is used as the face-detection algorithm. AdaBoost is a technique to form a strong discrimination by connecting, in series, multiple weak discriminations. A Haar type rectangular feature is set in each of the weak discriminations. The following description is based on an assumption that every single weak discrimination analyzes two rectangular areas as shown in FIG. 12. The weak discriminations analyze rectangular features for each rectangular area. If the relationships among the rectangular features are the same as the results obtained by previous learning, evaluation values are added up. The rectangular features to be analyzed by each of the weak discriminations differ from one weak discrimination to another. As FIG. 13 shows, a single strong discrimination (i.e., a detector) is formed by connecting, in series, the weak discriminations. The evaluation value of each rectangular area is added up by each of the weak discriminations, and thus obtained is an added evaluation value. When the added evaluation value becomes equal to or lower than a predetermined threshold, the processing is stopped. Thus, the speed of the processing becomes faster than otherwise. If all the weak discriminations eventually determine that the analyzed areas are face candidates, the area identified by the rectangular areas is outputted as a face area.

The foregoing description is based on a case where Ada-Boost is used as the detector, but the invention is of course applicable to other face-detection algorithms such as Nural-Network.

Figure 2:
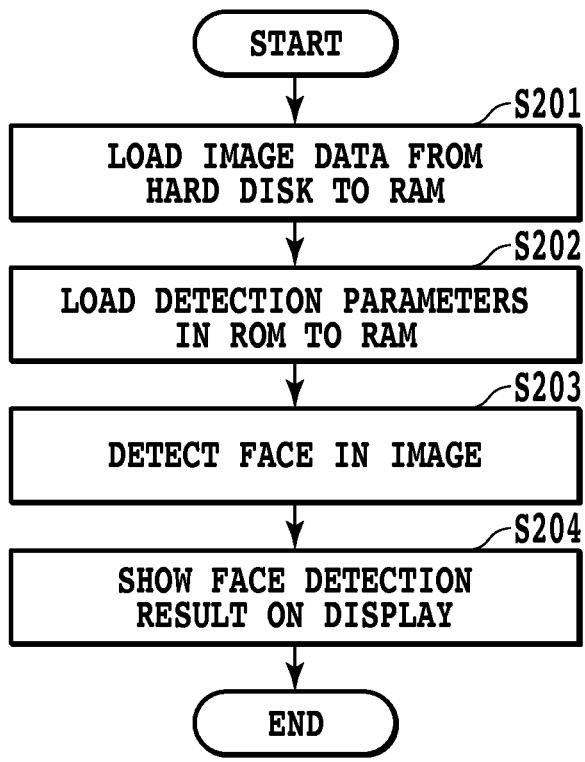
FIG. 2 is a flowchart illustrating the flow of processes to detect faces according to the first embodiment.
Figure 3:
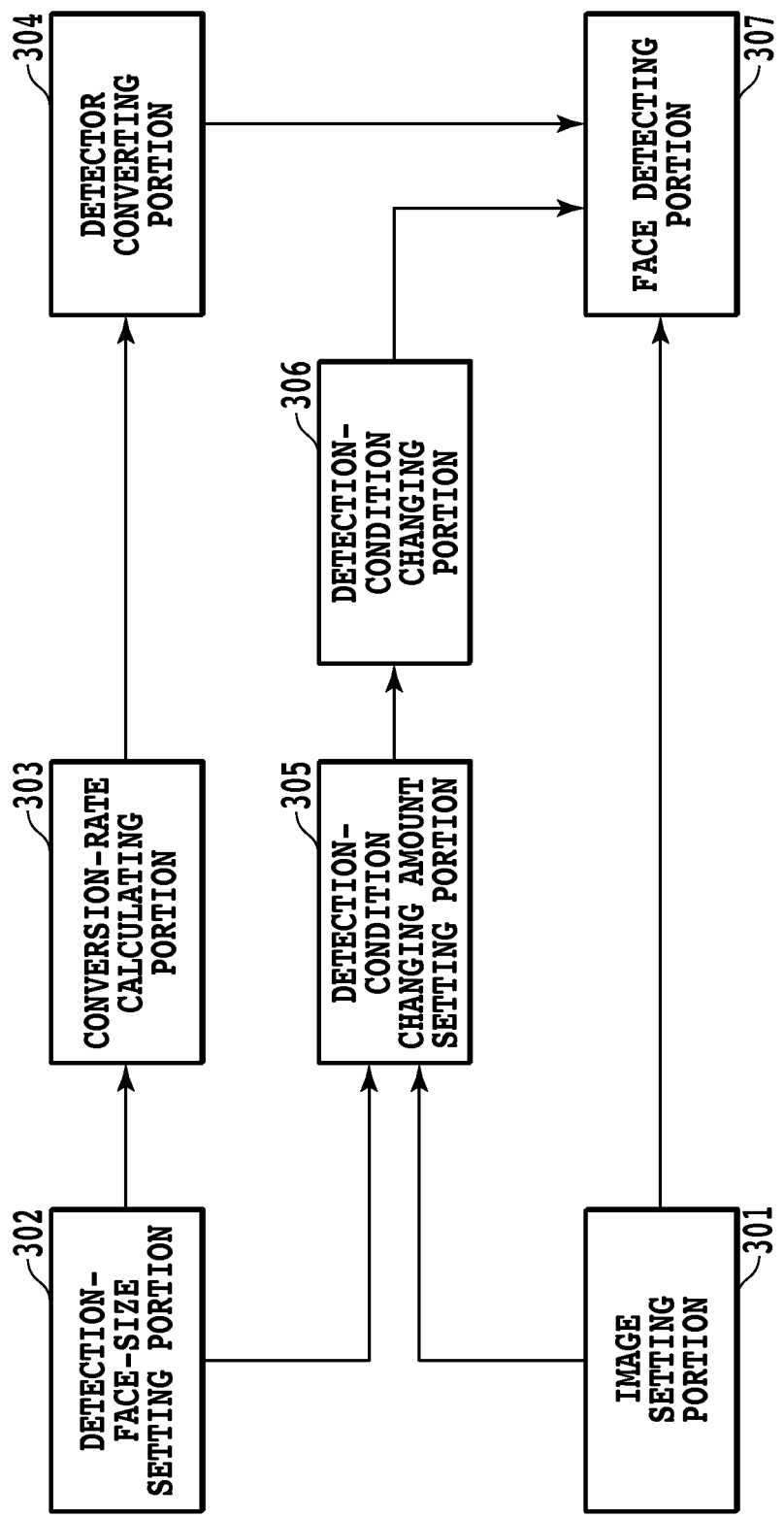
FIG. 3 is a block diagram illustrating a configuration example of the image processing apparatus according to the first embodiment.

Though the face-detection operation has been outlined by referring to FIG. 2, more detailed description of the face-detection operation will be given below. FIG. 3 is a block diagram illustrating a configuration example of the image processing apparatus according to the first embodiment of the invention.

An image used for the face searching is stored in the hard disk 103, and an image setting portion 301 sets this image in the RAM area. The image setting portion 301 loads an image file stored in the hard disk 103 down to the RAM area. The image setting portion 301 then outputs image data and image size of the image thus loaded. In the following description, the width of the image is denoted by W (pixels) and the height of the image is denoted by H (pixels).

A detection-face-size setting portion 302 sets the size of the face to be detected (detection face size) from the image. A face detecting portion 307, which will be described later, searches the image for the face of the size set by the detection-face-size setting portion 302. The detection face size thus set by the detection-face-size setting portion 302 is outputted from the detection-face-size setting portion 302. The following description is based on a case where the detection face size is set by using the pre-set face size in the method of setting the detection face size. The width of the detection face size is denoted by Hs (pixels), and the height of the detection face size is denoted by Hs (pixels). Alternatively, the detection face size may be set by the diagonal lines and the area of the detection face size. Needless to say, the detection face size may be set on a case-by-case basis by the user.

A conversion-rate calculating portion 303 calculates the conversion rate that is used when the detector is converted so as to fit the detection face size. The "conversion of the detector" or similar expressions mean the changing of the searching area from which the face area is to be detected by the detector. The conversion-rate calculating portion 303 outputs the conversion rate calculated from the detection face size that has been inputted from the detection-face-size setting portion 302. The pre-set width of the detector (the searching area to be searched by the detector) is denoted by Wd (pixels), and the pre-set height of the detector is denoted by Hd (pixels). The following description is based on an assumption that the conversion rate is calculated from the pre-designed width Wd of the detector and the width Ws of the detection face size. The conversion rate R is calculated using the following formula.

[Formula 1]

$$R = Ws/Wd \quad (1)$$

In the above-described case, the conversion rate is calculated from the pre-designed width of the size of the detector and the width of the detection face size. Alternatively, the conversion rate may be calculated from the heights, the diagonal lines, or the areas of the above-mentioned two sizes. Needless to say, the conversion rate may be calculated from the size of the image (specifically, the width W of the image may be used) and the size of the detection face size (specifically, the width Ws of the detection face size may be used).

A detector converting portion 304 converts the detector in accordance with the conversion rate calculated by the conversion-rate calculating portion 303. Specifically, the detector converting portion 304 uses the inputted conversion rate R to convert the analysis positions and the like that are used to identify the analysis area included in the detector. The detector with the converted analysis positions and the like are outputted from the detector converting portion 304. The following description is based on an assumption that the rectangular shape to be classified by each of the weak discriminations is converted. A case of converting a rectangular shape will be described below by referring to FIG. 4.

Figure 4:
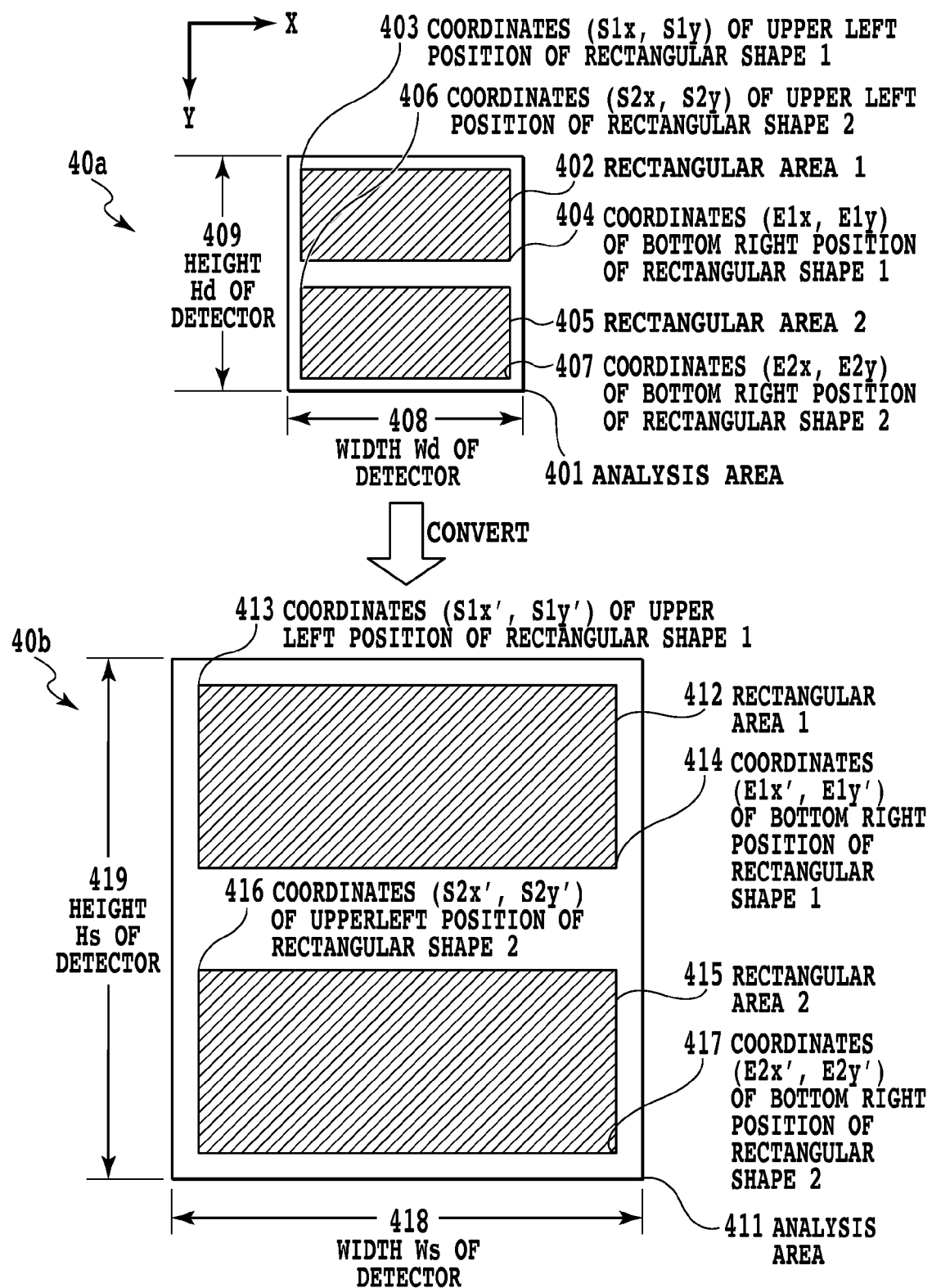
FIG. 4 is a diagram to describe one example of a method of converting a detector according to the first embodiment.

FIG. 4 is a diagram to describe a method of converting the detector in accordance with the conversion rate R so as to obtain a detector to detect a searching area of the same size as that of the detection face size. In FIG. 4, an area 40a is the searching area of the detector before the conversion. An area 401 is the analysis area to be analyzed by the detector. The analysis area 401 (i.e., searching area) is defined by the width Wd of the detector (a width 408 in FIG. 4) and the height Hd of the detector (a height 409 in FIG. 4). Within the analysis area, there are two rectangular areas that are the analysis targets: an area 402, which is a rectangular area 1; and an area 405, which is a rectangular area 2. These rectangular areas are located within an area identified by the width Wd of the detector and the height Hd of the detector. To specify each of the rectangular areas, the coordinates of the upper left position of the area and the coordinates of the bottom right position of the area are used. Specifically, the rectangular area 1 is expressed by the coordinates (S1x, S1y) of the upper left position (a position denoted by reference numeral 403 in FIG. 4) of the rectangular shape 1 and the coordinates (E1x, E1y) of the bottom right position (a position denoted by reference numeral 404 in FIG. 4) of the rectangular shape 1. Likewise, the rectangular area 2 is expressed by the coordinates (S2x, S2y) of the upper left position (a position denoted by reference numeral 406 in FIG. 4) of the rectangular shape 2 and the coordinates (E2x, E2y) of the bottom right position (a position denoted by reference numeral 407 in FIG. 4) of the rectangular shape 2. An area 40b is the searching area of the detector after the conversion. No detailed description for the searching area 40b will be given because each portion can be described in a similar manner to that for the area 40a. What are given below are the conversion formulae, using the conversion rate, for the coordinates of the positions of each rectangular shape.

[Formula 2]

$$S1x' = R*S1x$$

$$S1y' = R*S1y$$

$$E1x' = R*E1x$$

$$E1y' = R*E1y$$

$$S2x' = R*S2x$$

$$S2y' = R*S2y$$

$$E2x' = R*E2x$$

$$E2y' = R*E2y \quad (2)$$

Each of these $S1x'$, $S1y'$, $E1x'$, $E1y'$, $S2x'$, $S2y'$, $E2x'$, and $E2y'$ represents a coordinate position after conversion. Using Formula 2, the analysis positions are converted so as to fit the detection face size, and the detector thus obtained is outputted.

Now, refer back to FIG. 3. A detection-condition changing amount setting portion 305 changes and sets the detection conditions at the time of detection so as to fit the dimensions of the face size of the detection target. Specifically, if the detection face size set by the detection-face-size setting portion 302 has smaller dimensions, the detection-condition changing amount setting portion 305 changes the detection conditions at the time of detecting faces more strictly than in the case where the detection face size has larger dimensions. A detection-condition changing portion 306 outputs the amount of change for the detection conditions set by the detection-condition changing amount setting portion 305. The following description will be based on the assumption that the detection conditions are changed in accordance with the detection face size relative to the image size. The first step of changing the detection conditions is the calculation of a face ratio Rf from the width W of the image size and the width Ws of the detection face size. The face ratio Rf is calculated using the following formula.

[Formula 3]

$$Rf = Ws/W \quad (3)$$

Figure 5:
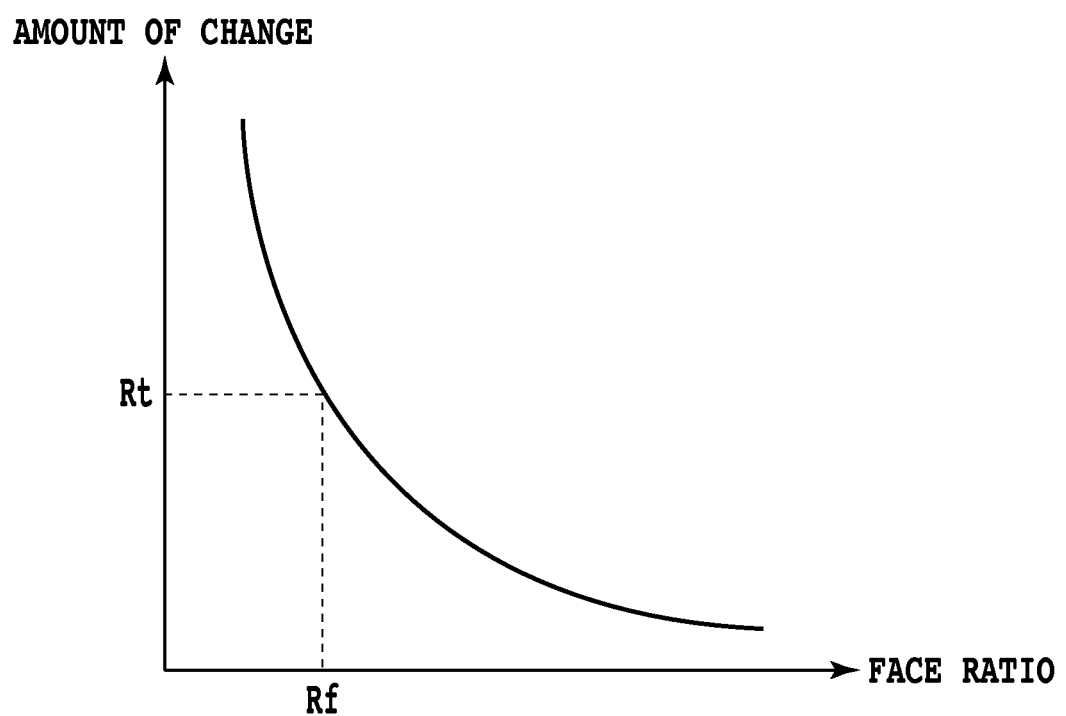
FIG. 5 is a graph to describe a case where the detection-condition changing amount is set by using a table according to the first embodiment.

While a table set in advance is referred to, the amount of change for the thresholds to be used in the face detection by the weak discriminations is set in accordance with the calculated face ratio Rf. FIG. 5 shows the table to be used for setting, in accordance with the face ratio Rf, the amount of change Rt for the detection conditions. Using the table, the amount of change Rt corresponding to the calculated face ratio Rf is set (note that Rt≥1). Using the amount of change Rt thus set, the thresholds of the weak discriminations are changed. These thresholds are used at the determination of whether the image in the searching area is or is not a face on the basis of the evaluation values obtained after weak classifications. A higher threshold requires a higher evaluation value to determine that the image is a face. So, a higher threshold contributes to a reduction in incorrect detection. The reference table to be used in determining the amount of change for the thresholds is set so that the smaller the detection face size is (i.e., the smaller the face ratio Rf is), the larger the increase in the threshold. In the foregoing description, the amount of change Rt for the detection conditions is set by referring to a table once. Alternatively, the amount of change Rt for the detection conditions may be set directly on the basis of the inputted face ratio Rf.

In the case where AdaBoost is used as the algorithm, a determination using the threshold is carried out by each of the weak discriminations. If one of the weak discriminations determines that the image is not a face because of the smaller evaluation value, no more processing will be executed. So, if a higher threshold is set for each weak discrimination, processing for an area that is not a face is terminated earlier. Consequently, the processing becomes faster. Such faster processing may be achieved when other detection algorithms are employed.

If plural detection face sizes are set, the face ratio Rf may be calculated from the relative relations of the plural detection face sizes. For example, suppose a case where there are three different detection face sizes are set and the widths of these detection face sizes are denoted by Ws1, Ws2, and Ws3, respectively. In this case, if Ws1<Ws2<Ws3, the face ratio Rf is set with the Ws3 used as the reference. If the width of the detection face size is Ws1, the face ratio Rf is calculated by a formula Rf=Ws1/Ws3. When the width of the detection face size is Ws2 or Ws3, the face ratio Rf can be calculated in a similar manner. In this way, if plural detection face sizes are set, calculating the face ratio Rf for one of the plural detection face sizes allows the face ratios for the other detection face sizes to be calculated automatically. By referring to the above-described table on the basis of calculated face ratio Rf, higher thresholds can be set for smaller detection face sizes.

A smaller size of the face to be detected (a smaller detection face size) results in more frequent incorrect detections unless the detection conditions for the face detection are changed in accordance with the face size thus set. Now, description is given of the reason for the tendency.

Figure 14:
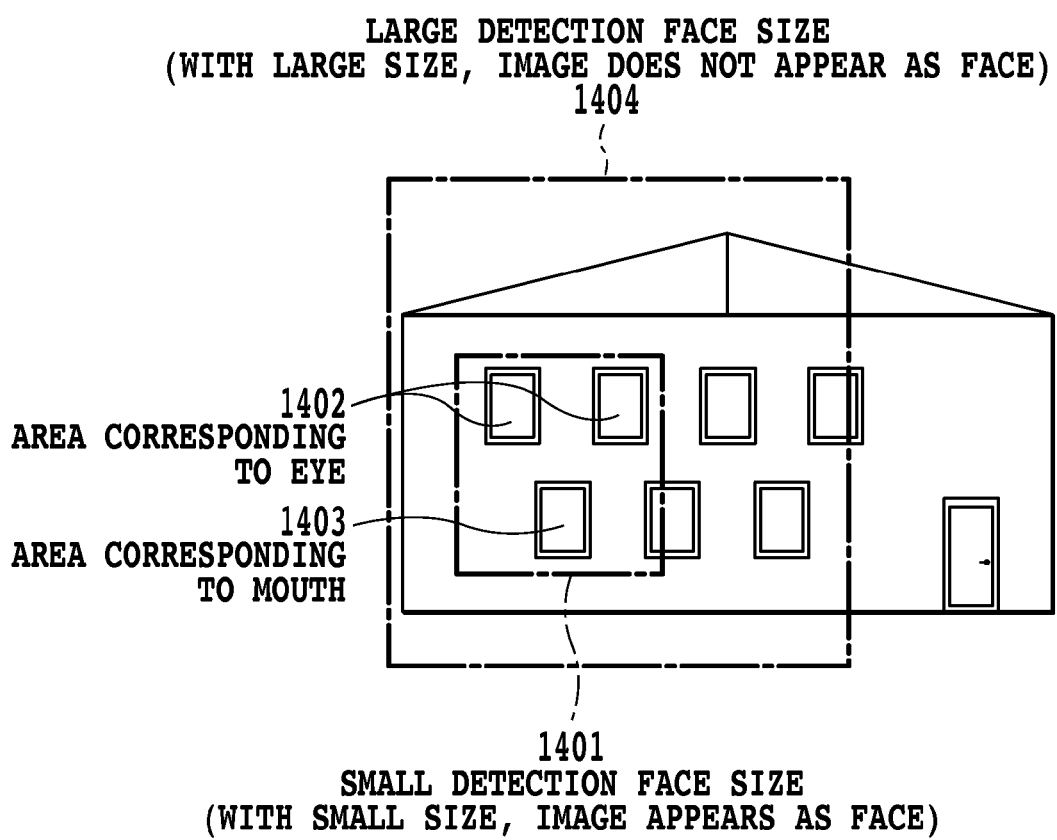
FIG. 14 is a view to describe a case where the smaller the size of a face to be detected is, the more likely to be incorrect the result of the detection becomes.

FIG. 14 is an image illustrating a house. The image includes various areas showing windows and a door. In FIG. 14, an area 1404 corresponds to a larger detection face size. With this larger detection face size, it is possible to determine that the image is not a face. Certain allocation of windows and the like combined with a smaller detection face size (represented by an area 1401), however, may make the image appear as a face. Specifically, portions 1402 in FIG. 14 may be erroneously recognized as areas showing eyes, and a portion 1403 may be erroneously recognized as an area showing a mouth. Consequently, a smaller detection face size is more likely to result in incorrect detection.

Figure 15A:
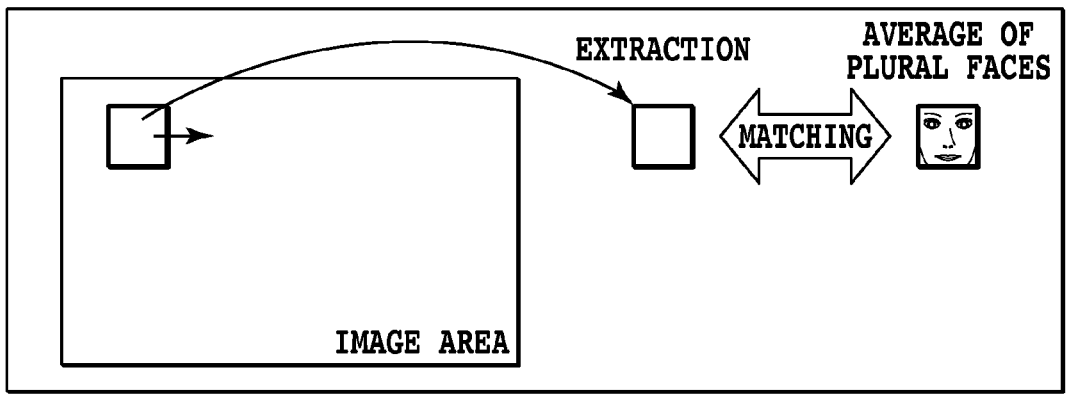
FIG. 15A is a diagram to describe an experiment example to test the hypothesis that, if the face to be detected has a particular size, the result of the detection becomes more likely to be incorrect.
Figure 15B:
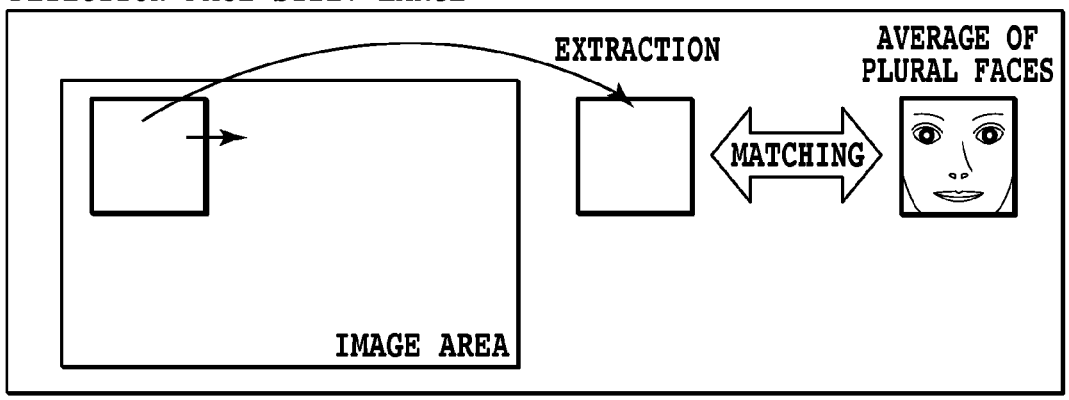
FIG. 15B is a diagram to describe an experiment example to test the hypothesis that, if the face to be detected has a particular size, the result of the detection becomes more likely to be incorrect.

To prove that a smaller detection face size is more likely to result in incorrect detection, it was examined whether textures in a natural image are more likely to appear face patterns in the case of a smaller detection face size or in the case of a larger detection face size. The examination was based on the method shown in FIGS. 15A and 15B. Areas of the smaller detection face size and of the larger detection face size were extracted from the image area of a natural image. Then, the coefficient of correlation between the extracted area of each size and an average face of plural persons was calculated. The coefficient of correlation for each area was calculated so as to cover the entire image. The average coefficient of correlation was calculated per image. The calculated average coefficient of correlation for the areas of the larger detection face size (the case of FIG. 15B) and the corresponding coefficient for the areas of the smaller detection face size (the case of FIG. 15A) were compared with each other. Similar comparisons were carried out for plural images. What was found out as a result of comparison between the average coefficients of correlation for the areas of the larger detection face size and the smaller detection face size is the fact that the average coefficient of correlation for the areas of the smaller detection face size is larger than that for the areas of the larger detection face size. To put it differently, a smaller analysis size makes textures contained in a natural image more likely to appear as face patterns. Consequently, with a smaller analysis area, it is more likely to detect incorrectly an area that is not actually a face than with a larger analysis area.

As has been described above, even with the same determination conditions (detection conditions), the case with a smaller detection face size is more likely to result in incorrect detection than the case with a larger detection face size. What is necessary to reduce incorrect detection is to carry out a flexible control in accordance with various sizes of the face to be detected. Without such a flexible control in accordance with various sizes of the face to be detected, incorrect detections occur more frequently in the case with a smaller detection face size. As a consequence, accurate detection results cannot be obtained.

Now, refer back to FIG. 3. The detection-condition changing portion 306 changes and sets the detection conditions in accordance with the inputted amount of change Rt for the detection conditions. The detection-condition changing portion 306 outputs the resultant detection conditions in accordance with the amount of change Rt for the detection conditions. Note that the amount of change Rt set by the detection-condition changing amount setting portion 305 is the amount of change for the thresholds of the evaluation values for the face detection using the weak discriminations. So, the threshold for each weak discrimination is changed in accordance with the following formula.

[Formula 4]

$$Th' = Th * Rt \qquad (4)$$

In the above Formula 4, Th is the threshold of the evaluation value for the face detection using the weak discrimination. Th' is the threshold of the evaluation value for the face detection after the changing. Note that when there are plural weak discriminations that differ from one another in threshold, the thresholds after the changing are calculated in accordance with their respective thresholds before the changing.

The face detecting portion 307 detects faces in an image. To this end, the face detecting portion 307 uses a detector with an analysis area that has been converted so as to fit the detection face size. The face detecting portion 307 also uses the detection conditions that have been changed so as to fit the detection face size. The face detecting portion 307 outputs the coordinates of the face.

The series of descriptions given thus far are of the image processing apparatus of the first embodiment.

Figure 6:
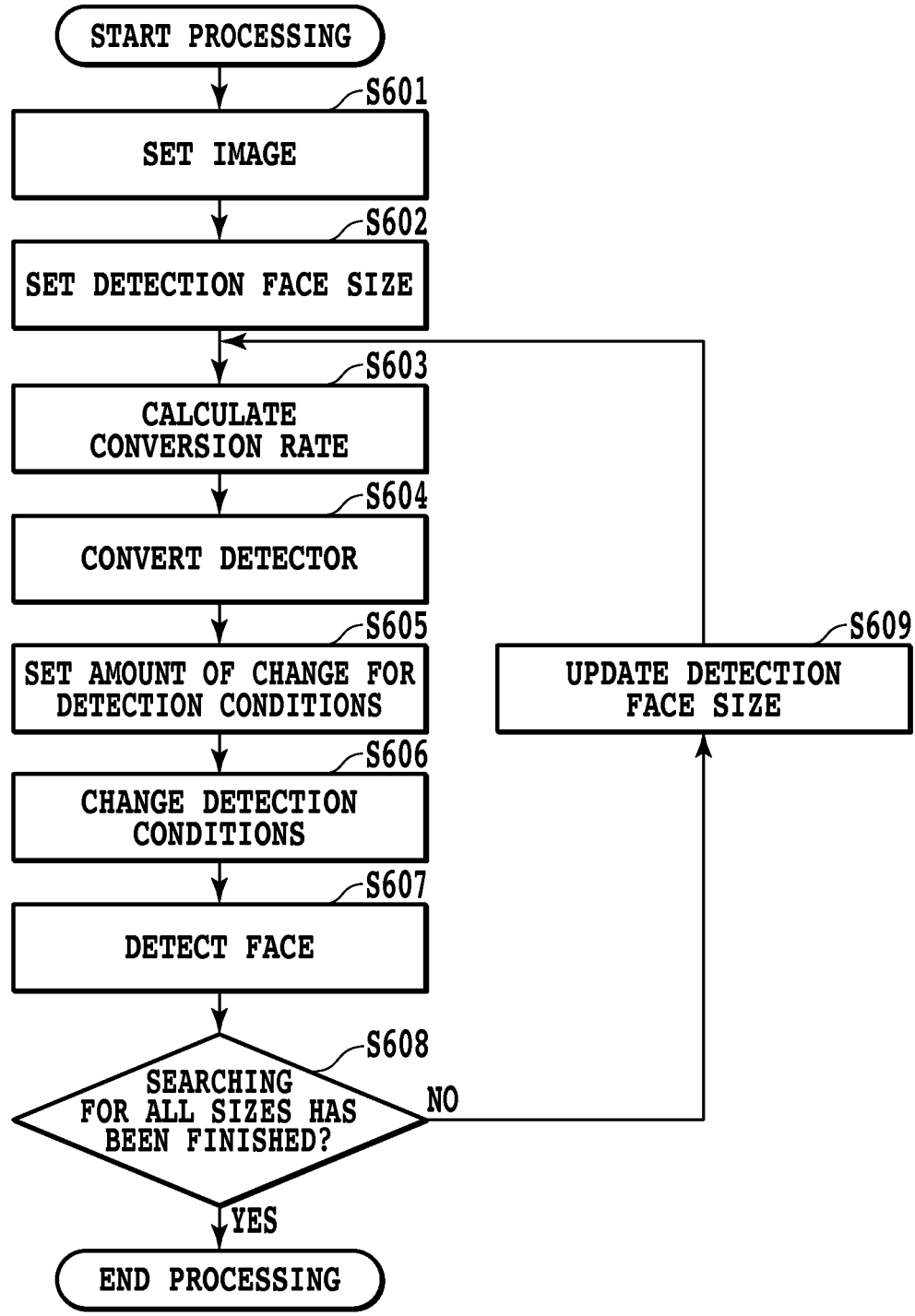
FIG. 6 is a flowchart illustrating the flow of processes of the image processing operation according to the first embodiment.

Next, description will be given of the operation procedure of the above-described image processing apparatus. FIG. 6 is a flowchart illustrating the flow of processes of the first embodiment.

Firstly, by inputting the image file into the RAM area, the image setting portion 301 sets an image from which faces are to be detected (step S601).

Subsequently, the detection-face-size setting portion 302 sets the size of the face to be detected (detection face size) from the image set at step S601 (step S602).

Subsequently, the conversion-rate calculating portion 303 calculates the conversion rate that is used when the analysis area of the detector is converted so as to fit the detection face size set at step S602 (step S603). In the first embodiment, the conversion rate is calculated from the pre-designed size of the detector and the detection face size.

Subsequently, the detector converting portion 304 converts the detector in accordance with the conversion rate calculated at step S603 (step S604). To put it differently, the searching area to be searched by the detector is changed so as to fit the detection face size.

Subsequently, the detection-condition changing amount setting portion 305 sets the amount of change for the detection conditions so as to fit the detection face size set at step S602 (step S605). In this embodiment, the proportion of the detection face size to the image size is calculated as the face ratio. Then, the amount of change for the detection conditions is set by referring to the pre-set table in accordance with the face ratio thus calculated. FIG. 5 shows an example of the table used for this purpose. The table is characterized in that a smaller detection face size reduces the occurrence of incorrect detections.

Subsequently, the detection-condition changing portion 306 changes the detection conditions (step S606). In this embodiment, the detection conditions are changed on the basis of the amount of change calculated by the detection-condition changing amount setting portion 305.

Subsequently, the face detecting portion 307 detects the face area from the image (step S607) by use of the detector converted at step S604 and the detection conditions changed at step S606.

If plural detection face sizes are set, whether detections for all the sizes have been finished or not is determined (step S608). If detections for some of the sizes have not been finished, the detection face size is altered to a new one (step S609). The processing is repeated by the number of times the face sizes are detected. The processing is ended when the detections for all the sizes are finished.

According to the first embodiment, as the size of the face to be detected becomes smaller, the thresholds, used by the weak discriminations, for determining that the image is a face become higher. Accordingly, a smaller size of the face to be detected makes the detection conditions stricter, so that the occurrence of incorrect detection becomes less likely. In addition, the stricter detection conditions increase the proportion of the determination that the image is not a face. With this determination, the detection processing can be terminated even in the course of the detection processing. Consequently, the processing time can be shortened. According to a certain evaluation DB, though the use of the stricter thresholds results in 5% drop in the detection performance (the number of detected faces from the faces in the images) from the detection performance before the changing of the thresholds, the occurrence of incorrect detection is reduced by 50%. In addition, the time needed for the detection is shortened to be $\frac{1}{5}$ of the time needed before the changing of the thresholds. Note that the table used to this end is an optimal one achieved by learning.

In the foregoing description, the smaller the detection face size is, the higher the thresholds for the evaluation values used in the detection of faces by the weak discriminations. Alternatively, the thresholds for other items than the evaluation values may be controlled for the same purpose.

For example, if faces are detected on the basis of the statistics in the analysis area, the thresholds for the statistics may be the target of the control. Such statistics may be the average value, the standard deviation, the variance, or other items for the luminance components within the area. Still alternatively, statistics for other image components may be used instead.

In addition, if, for example, faces are detected on the basis of the combination of edges in the image, the target of control may be the threshold for the evaluation value for edges.

In addition, if, for example, faces are detected on the basis of the number of pixels with particular hues in the analysis area, the target of control may be the threshold for the number of those pixels.

In addition, if, for example, faces are detected by template matching, the target of control may be the threshold used when determination is carried out concerning the evaluation value obtained from the correlations with the template.

In addition, if, for example, face-detection processing is executed by facial-part detection, the target of control may be the threshold used when determination is carried out concerning the evaluation value for the facial parts in the feature space.

In addition, if, for example, faces are detected on the basis of relative positions of the detected facial parts, the target of control may be the allowable range of the difference between the detected distance from one facial part to another and the corresponding pre-set distance.

In addition, for example, the evaluation amount obtained by the result of evaluation on the analysis area may be the target of control. In this case, the evaluation amount is set to become smaller as the detection face size is smaller.

Second Embodiment

The apparatus to be described in the second embodiment is an apparatus to detect faces as follows. The apparatus converts the image so as to fit the size of the face to be detected, and changes the detection conditions so as to fit the size of the face to be detected. Then, the apparatus uses the resultant detection conditions when the apparatus detects faces from the resultant image after the conversion. The processing of the second embodiment differs from the processing of the first embodiment in that the apparatus of the second embodiment detects faces not by converting the detector but by converting the image. To put it differently, the description of the first embodiment is based on a case where the setting of the searching area appropriate for the detection face size is accomplished by changing the analysis area (searching area) of the detector. In contrast, the description of the second embodiment is based on a case where it is not the detector but the size of the inputted image to be converted for the purpose of accomplishing the setting of the searching area appropriate for the detection face size. The image processing apparatus of the second embodiment is identical to the apparatus of the first embodiment with the hardware configuration shown in FIG. 1. So, no description of the apparatus of the second embodiment will be given.

Figure 7:
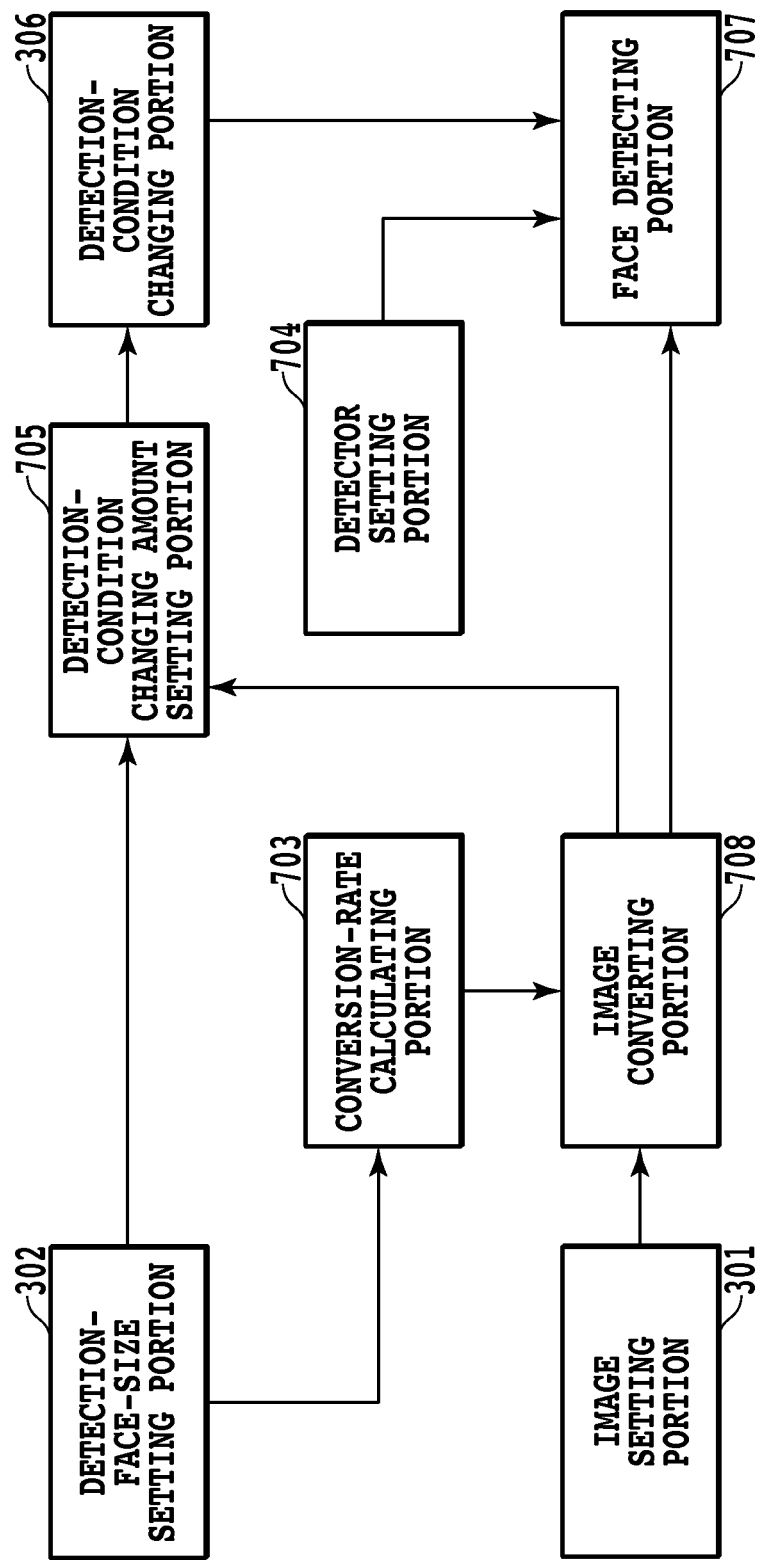
FIG. 7 is a block diagram illustrating a configuration example of an image processing apparatus according to a second embodiment.

FIG. 7 is a block diagram illustrating a configuration example of the image processing apparatus according to the second embodiment of the invention. The components in FIG. 7 with the same reference numerals as those in FIG. 3 are to perform the same contents of processing as their respective counterparts described in the first embodiment. So no detailed description of these components will be given below. Only the components that have no counterparts in the first embodiment will be described below.

A conversion-rate calculating portion 703 calculates the conversion rate that is used when the image is converted so as to fit the detection face size. The conversion-rate calculating portion 303 of the first embodiment calculates the conversion rate that is used when the detector is converted, but the conversion-rate calculating portion 703 of the second embodiment calculates the conversion rate that is used when the image is converted. The conversion-rate calculating portion 703 outputs the conversion rate R thus calculated. The method of calculating the conversion rate R in the second embodiment is the same as the one described in the first embodiment. So, the calculation method will not be described below.

An image converting portion 708 converts the image set by the image setting portion 301 so as to fit the detection face size. The image converting portion 708 outputs an image that has been converted in accordance with the conversion rate R calculated by the conversion-rate calculating portion 703. For example, if the detection face size is small, the image is converted so as to be made larger in size. In contrast, if the detection face size is large, the image is converted so as to be made smaller in size. The following description is based on an assumption that the image is converted by reducing/enlarging linearly the size of the image in accordance with the conversion rate. The size of the resultant image after the conversion has a width W' (pixels) and a height H' (pixels). Needless to say, other image-conversion algorithms may be used for the conversion of the image.

A detection-condition changing amount setting portion 705 changes and sets the detection conditions at the time of detection so as to fit the dimensions of the detection face size. The detection-condition changing amount setting portion 705 outputs the amount of change for the detection conditions set by the detection-condition changing amount setting portion 705. The following description will be based on an assumption that the detection conditions are changed in accordance with the detector size relative to the image size after the conversion. The first step of changing the detection conditions is the calculation of the face ratio Rf from the width W' of the image after the conversion and the width Wd of the detector. The face ratio Rf is calculated using the following formula.

[Formula 5]

$$Rf = Wd/W' \quad (5)$$

While a table set in advance is referred to, the amount of change for the thresholds to be used in the face detection by the weak discriminations is set in accordance with the calculated face ratio Rf. Similar setting of the amount of change for the detection conditions to the corresponding setting in the first embodiment can be done by referring to the table shown in FIG. 5 as in the case of the first embodiment. According to Formula 5, the larger the width W' of the image after the conversion is, the smaller the face ratio Rf becomes. Note that, as described above, a larger width W' of the image after the conversion is equivalent to a smaller detection face size. So, as described in the first embodiment, if the detection face size is smaller, the face ratio Rf becomes smaller. Consequently, the amount of change Rt is set by referring to the table shown in FIG. 5.

A detector setting portion 704 sets the detector to be used when faces are searched for from the image. Although the image processing apparatus of the first embodiment includes the detector converting portion 304 provided to change the searching area to be searched by the detector, the image processing apparatus of the second embodiment includes no such detector converting portion.

A face detecting portion 707 detects faces in an image converted by the image converting portion 708. To this end, the face detecting portion 707 uses the detector having been set in the above-described manner and the detection conditions having been changed in the above-described manner. The face detecting portion 707 outputs the coordinates of the face.

The series of descriptions given thus far are of the image processing apparatus of the second embodiment.

Figure 8:
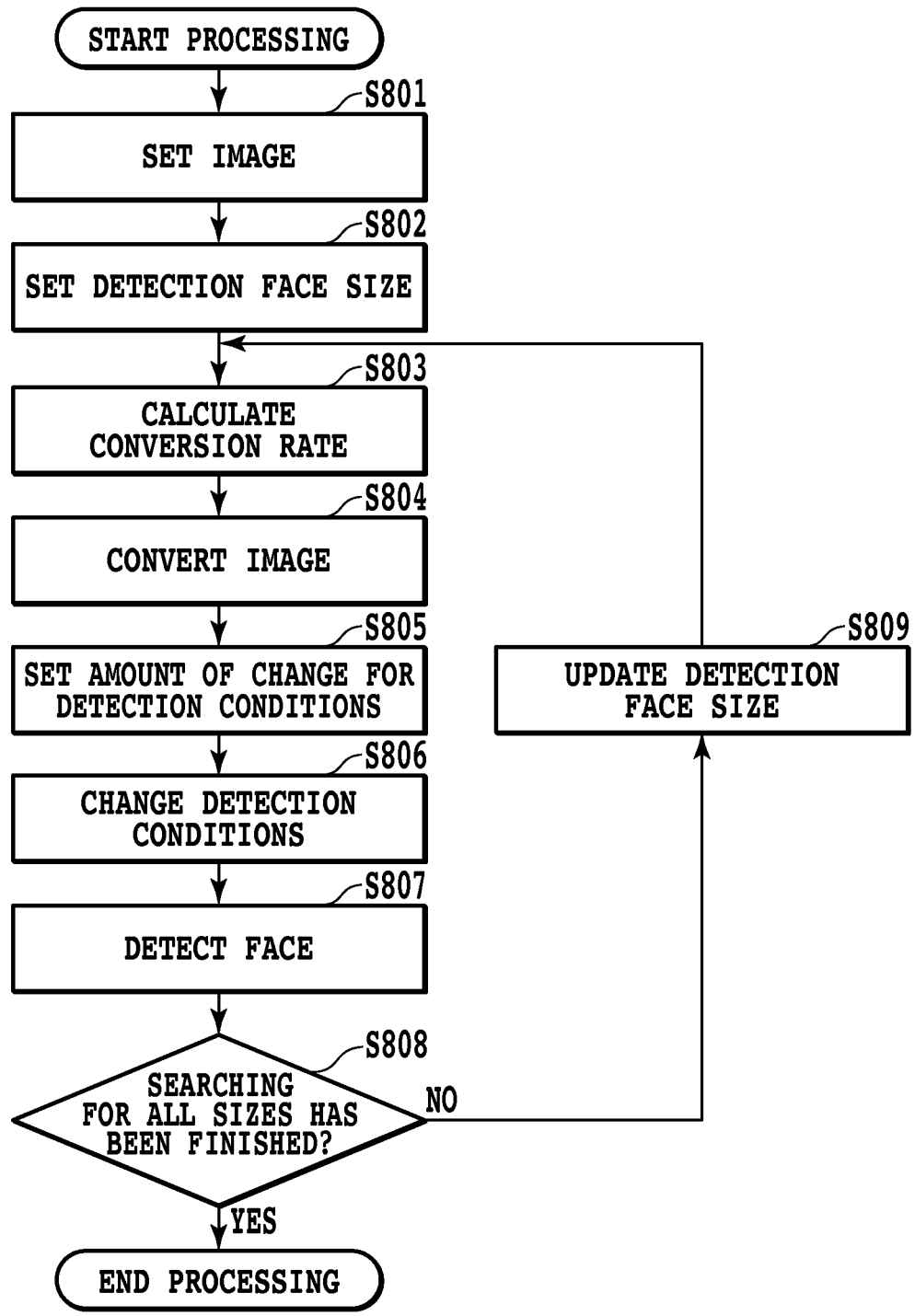
FIG. 8 is a flowchart illustrating the flow of processes of the image processing operation according to the second embodiment.

Next, description will be given of the operation procedure of the above-described image processing apparatus. FIG. 8 is a flowchart illustrating the flow of processes of the image processing apparatus.

Firstly, by inputting the image file into the RAM area, the image setting portion 301 sets an image from which faces are to be detected (step S801).

Subsequently, the detection-face-size setting portion 302 sets the size of the face to be detected (detection face size) from the image set at step S801 (step S802).

Subsequently, the conversion-rate calculating portion 703 calculates the conversion rate that is used when the image is converted so as to fit the detection face size set at step S802 (step S803). In the second embodiment, the conversion rate is calculated from the pre-designed size of the detector and the detection face size.

Subsequently, the image converting portion 708 converts the image in accordance with the conversion rate calculated at step S803 (step S804). The second embodiment differs from the first embodiment in this process to convert the image in accordance with the conversion rate.

Subsequently, the detection-condition changing amount setting portion 705 sets the amount of change for the detection conditions so as to fit the detection face size set at step S802 (step S805). In this embodiment, the proportion of the detector size to the image size after the conversion is calculated as the face ratio. Then, the amount of change for the detection conditions is set by referring to the pre-set table in accordance with the face ratio thus calculated. In the tables used for this purpose, a smaller detection face size reduces the occurrence of incorrect detections.

Subsequently, the detection-condition changing portion 306 changes the detection conditions (step S806). In this embodiment, the detection conditions are changed on the basis of the amount of change calculated by the detection-condition changing amount setting portion 705.

Subsequently, the face detecting portion 707 detects the face area from the image after the conversion (step S807) by use of the detector inputted by the detector setting portion 704 and the detection conditions changed at step S806.

If plural detection face sizes are set, whether detections for all the sizes have been finished or not is determined (step S808). If detections for some of the sizes have not been finished, the detection face size is altered to a new one (step S809). The processing is repeated by the number of times the face sizes are detected. The processing is ended when the detections for all the sizes are finished.

According to the method described in the first embodiment, the size of the detector is converted so as to fit the size of the face. In contrast, according to the method described in this second embodiment, the size of the image is converted so as to fit the size of the detector. The method of this second embodiment is more effective than the method of the first embodiment if the processing to convert the size of the detector imposes heavy loads to the apparatus. For example, if many weak discriminations are used in face detection using AdaBoost algorithm, the time needed to convert the detector may be longer than the time needed to convert the image. In this case, like the method of the second embodiment, a method in which the image is converted so as to fit the size of the detector, is more effective.

Accordingly, a method combining the above-mentioned two kinds of methods may be employed. Specifically, if the number of detectors used in the face detection is larger than a threshold, the size of the image is converted so as to fit the size of the detector; if the number of detectors used in the face detection is equal to or smaller than the threshold, the size of the detector is converted so as to fit the size of the face included in the image.

According to the second embodiment, as the size of the face to be detected becomes smaller, the thresholds for determining that the image is a face become higher. Accordingly, the detection conditions become stricter, so that the occurrence of incorrect detection becomes less likely. In addition, the higher determination thresholds increase the proportion of the determination that the image is not a face in the course of the face-detection processing. Consequently, faster processing can be achieved.

Third Embodiment

The apparatus to be described in the third embodiment is an apparatus to detect faces as follows. The apparatus selects a detector so as to fit the size of the face to be detected, and then converts the selected detector so as to fit the size of the face to be detected. Thus, faces are detected using the resultant detector after the conversion. The processing of the third embodiment differs from the processings of the first and the second embodiments in that the apparatus of the third embodiment selects a detector so as to fit the size of the face to be detected. To put it differently, both the description of the first embodiment and the description of the second embodiment are based on a case where the amount of change for the detection conditions is calculated so as to fit the detection face size and the calculated amount of change for the detection conditions is used for the detector. In contrast, the description of the third embodiment is based on a case where an appropriate detector is selected from plural detectors so as to fit the detection face size.

The image processing apparatus of the third embodiment is identical to the apparatus of the first embodiment with the hardware configuration shown in FIG. 1. So, no description of the apparatus of the third embodiment will be given.

Figure 9:
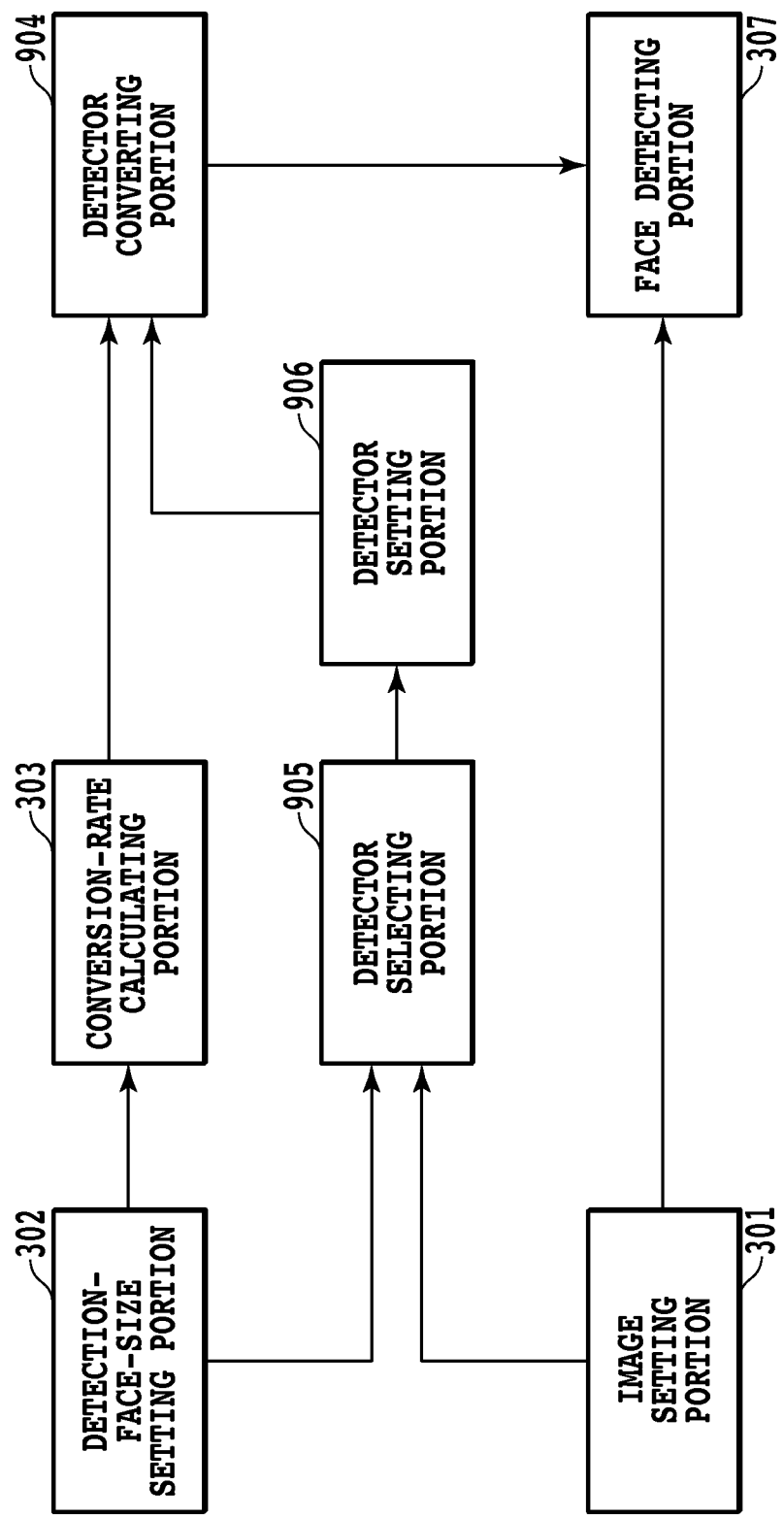
FIG. 9 is a block diagram illustrating a configuration example of an image processing apparatus according to a third embodiment.

FIG. 9 is a block diagram illustrating a configuration example of the image processing apparatus according to the third embodiment of the invention. The components in FIG. 9 with the same reference numerals as those in FIG. 3 are to perform the same contents of processing as their respective counterparts described in the first embodiment. So no detailed description of these components will be given below. Only the components that have no counterparts in the first embodiment will be described below.

A detector selecting portion 905 selects a detector to be used from plural detectors so as to fit the detection face size. The detector selecting portion 905 outputs the ID of the selected detector. The following description is based on a case where the selection of the detector is based on the detection face size relative to the image size. The first step of the detector selection is the calculation of the face ratio Rf from the width W of the image size and the width Ws of the detection face size. The face ratio Rf is calculated using the following formula.

[Formula 6]

$$Rf = Ws/W \qquad (6)$$

Under conditions set in advance, the ID of the detector to be used in the detection is determined in accordance with the calculated face ratio Rf. The following description is based on a case where three kinds of face detectors employing AdaBoost algorithm are provided in advance and all the detectors have the same size (searching area). The detection performances of the detectors differ from one another because the learning methods employed by the detectors differ from one another. A method of selecting the detector will be described in detail by referring to FIG. 10.

FIG. 10 is a table to determine the ID of the detector to be set as the detector used in the face detection. The ID of the detector is determined in accordance with the face ratio Rf. In FIG. 10, Ra and Rb are within a pre-determined range for setting the face ratio. In accordance with the value of the calculated face ratio relative to the pre-set range, which one of the three kinds of learning tables of AdaBoost is to be used (in short, which one of the detectors is to be used) is determined. For example, when the three kinds of learning tables are designed, different image data to be used are set respectively. The detection performances of the learning tables are measured by use of an evaluation DB. Consequently, the user can have an idea of how good the performance of each leaning table is.

A face ratio that is smaller than the setting range means a small detection face size. So, in this case, when the detector is selected, what has to be taken into consideration is the need for the reduction in the occurrence of incorrect detection. Accordingly, a detector Ver 1 is selected as the detector used in the face detection because the use of the detector Ver 1 makes the occurrence of incorrect detection quite rare. In the third embodiment, a detector is selected so as to fit the detection face size from the plural detectors that have learnt beforehand by use of their respective leaning tables. So, also by the selection of the detector in the third embodiment, faster processing can be achieved while the occurrence of incorrect detection is reduced as in the case of the first and the second embodiments.

The foregoing description is based on a case of three kinds of detectors using the same detection algorithm but showing different detection performances. Alternatively, different detection algorithms with different detection performances may be used.

The foregoing description is based on a case where the optimal detector is selected when learning tables are made to correspond respectively to the detectors. Alternatively, the tables (learning parameters) used at the detection may be changed from one to another so as to fit the detection face size. For example, suppose a case where skin-color tables are used in the determination of skin colors that is carried out as a part of the face-detection processing. In this case, as the detection face size is smaller, a skin-color table with stricter determination criteria is used. Consequently, the detection performance can be controlled so as to fit the detection face size. In the creation of the skin-color table with stricter determination criteria, only face data taken under adequate exposure conditions can be used. Using the skin-color table thus created with stricter determination criteria as a reference, skin-color tables with different determination criteria are created. The skin-color tables with different determination criteria can be created by adding face data taken under under-exposure conditions to the analysis candidates in a step-by-step manner.

On the basis of the ID of the detector outputted by the detector selecting portion 905, a detector setting portion 906 sets (changes) the detector to be used in the face detection. Plural kinds of detectors (three kinds of detectors in this third embodiment) that have been prepared beforehand are stored in the ROM area. The detector thus selected on the basis of the ID is loaded from the ROM area to the RAM area.

A detector converting portion 904 converts the detector that has been set by the detector setting portion 906. The conversion is done in accordance with the conversion rate calculated by the conversion-rate calculating portion 303. The detector converting portion 904 adopts a similar method of converting the detector to the method employed by the detector converting portion 304 in the first embodiment. So, no description of the method will be given here.

The series of descriptions given thus far are of the image processing apparatus of the third embodiment.

Figure 11:
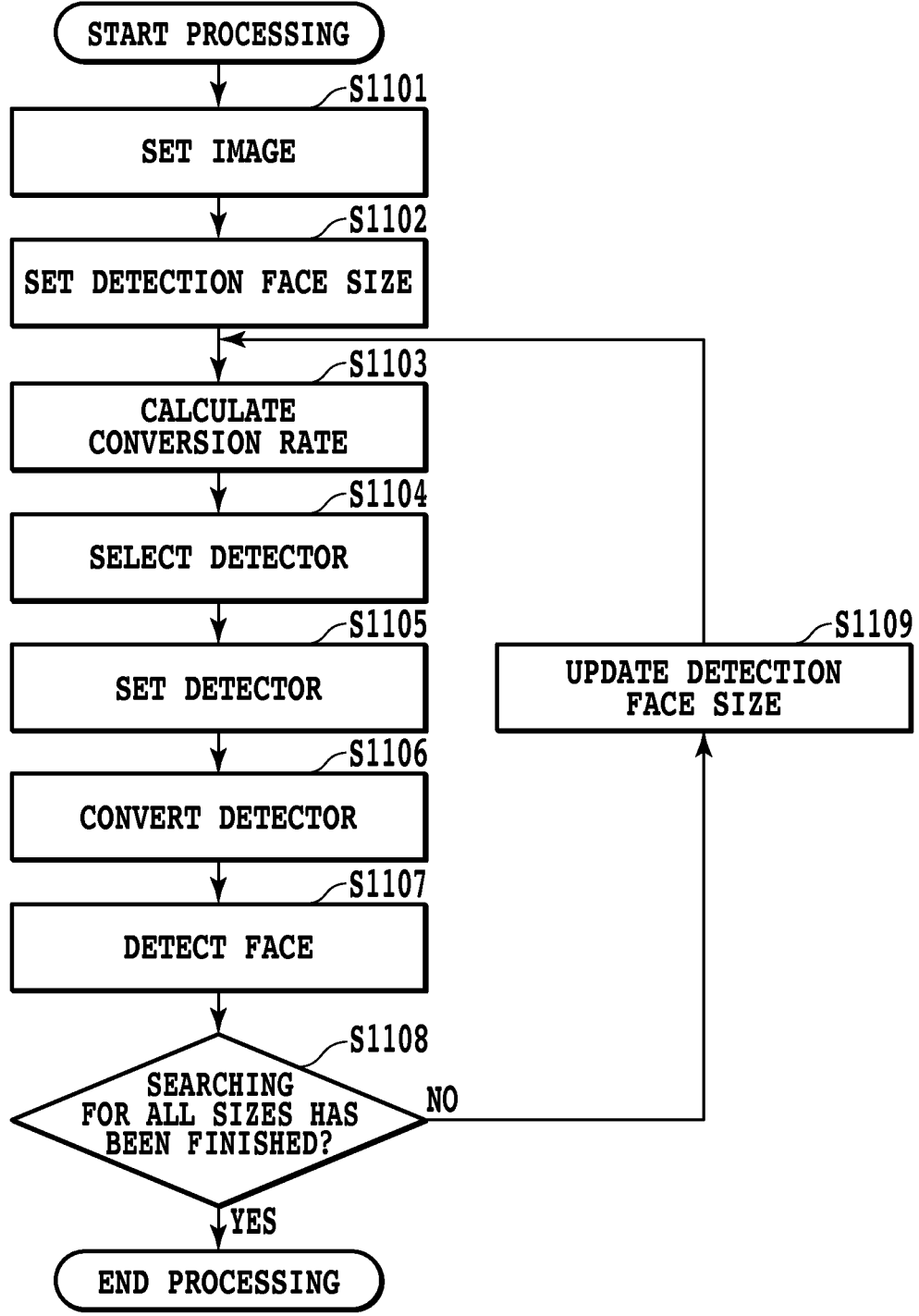
FIG. 11 is a flowchart illustrating the flow of processes of the image processing operation according to the third embodiment.

Next, description will be given of the operation procedure of the above-described image processing apparatus. FIG. 11 is a flowchart illustrating the flow of processes of the image processing apparatus.

Firstly, by inputting the image file into the RAM area, the image setting portion 301 sets an image from which faces are to be detected (step S1101).

Subsequently, the detection-face-size setting portion 302 sets the size of the face to be detected (detection face size) from the image (step S1102).

Subsequently, the conversion-rate calculating portion 303 calculates the conversion rate that is used when the detector is converted so as to fit the detection face size set at step S1102 (step S1103). In the third embodiment, the conversion rate is calculated from the pre-designed size of the detector and the detection face size.

Subsequently, the detector selecting portion 905 selects the detector to be used so as to fit the detection face size set at step S1102 (step S1104).

Subsequently, the detector setting portion 906 sets the detector selected at step S1104 (step S1105)

Subsequently, the detector converting portion 304 converts the detector that has been set at step S1105. The detector is converted in accordance with the conversion rate calculated at step S1103 (step S1106).

Subsequently, the face detecting portion 307 detects the face area from the image by use of the detector converted at step S1106 (step S1107).

If plural detection face sizes are set, whether detections for all the sizes have been finished or not is determined (step S1108). If detections for some of the sizes have not been finished, the detection face size is altered to anew one (step S1109). The processing is repeated by the number of times the face sizes are detected. The processing is ended when the detections for all the sizes are finished.

According to the third embodiment, as the size of the face to be detected becomes smaller, the detection setting is changed stricter as in the cases of the first and the second embodiments. Thus, the occurrence of incorrect detection is made less likely. The determination that the image is not a face is obtained more frequently in the course of the face-detection processing. Consequently, faster processing can be achieved. In addition, since the detector that fits better the size of the face is selected and used in the face detection, the reduction in the occurrence of incorrect detection can be done with higher accuracy.

Each of the embodiments described above is based on a case where either the detector or the image is converted so as to fit the size of the face to be detected. Alternatively, both the detector and the image may be converted so as to fit the size of the face to be detected.

In addition, for the purpose of making the detection conditions stricter, as the size of the face to be detected becomes smaller, the evaluation value representing the reliability of the face, that is, representing the possibility that the image is a face, may be lowered. For example, suppose a case where the detection algorithm is AdaBoost. In this case, the detection conditions can be made stricter by lowering the evaluation value obtained by each of the weak discriminations as the size of the face to be detected becomes smaller. In the cases of employing other algorithms, the detection conditions can be made stricter in a similar manner.

In addition, for the purpose of making the detection conditions stricter, the range of color features of particular colors to be used in the face-detection determination may be narrowed. For example, suppose a case where a color gamut of skin colors is used as the determination condition at the time of detection. For the purpose of making the detection conditions stricter, as the size of the face to be detected becomes smaller, the color gamut that can be considered as the skin of the face has to be narrowed.

The invention is applicable to a system including plural apparatuses (e.g., a computer, an interface device, a reader, a printer, and the like). The invention is also applicable to an independent apparatus (a multi-function machine, a printer, a fax, or the like).

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-154068, filed Jun. 29, 2009, which is hereby incorporated by reference herein in its entirety.

What is claimed is:

1. An image processing apparatus for detecting a face in an image using a plurality of discriminations, the image processing apparatus comprising:

a setting unit configured to set a a plurality of thresholds used for the plurality of discriminations, such that, as a face size of a detection target in an image is smaller, a higher threshold is set to reduce incorrect detection of an area that is not a face; and a detecting unit configured to calculate a plurality of evaluation values from an area corresponding to the face size of the detection target in the image using the plurality of discriminations, and to detect a face in the image using the plurality of thresholds set by the setting unit and the plurality of calculated evaluation values, wherein the detecting unit stops detecting in the area based on a result of comparing an evaluation value calculated by at least one discrimination of the plurality of the discriminations with at least one threshold of the plurality of thresholds set by the setting unit.

2. An image processing apparatus for detecting a face in an image using a plurality of discriminations, the image processing apparatus comprising:
   a setting unit configured to set a plurality of thresholds used for the plurality of discriminations, such that, as a face size of a detection target in an image is smaller, a higher threshold is set to reduce incorrect detection of an area that is not a face; and
   a detecting unit configured to detect a face in the image using the threshold set by the setting unit and a sum of evaluation values calculated from an area corresponding to the face size of the detection target in the image using at least two discriminations of the plurality of discriminations,
   wherein the detecting unit stops detecting in the area based on a result of comparing (a) the sum of evaluation values and (b) at least one threshold of the plurality of thresholds set by the setting unit.

3. The image processing apparatus according to claim 1, wherein the face size of the detection target is set according to a width and a height of a detection target.

4. The image processing apparatus according to claim 1, wherein a face detection in the detecting unit is performed using AdaBoost.

5. An image processing method, executed by a device comprising a processor, for detecting a face in an image using a plurality of discriminations, the method comprising the steps of:
   setting a plurality of thresholds used for the plurality of discriminations, such that, as a face size of a detection target in an image is smaller, a higher threshold is set to reduce incorrect detection of an area that is not a face;
   calculating a plurality of evaluation values from an area corresponding to the face size of the detection target in the image using the plurality of discriminations; and
   detecting a face in the image using the plurality of thresholds set in the setting step and the plurality of calculated evaluation values,
   wherein the detecting step includes stopping detecting in the area based on a result of comparing an evaluation value calculated by at least one discrimination of the plurality of the discriminations with at least one threshold of the plurality of thresholds set in the setting step.

6. An image processing method, executed by a device comprising a processor, for detecting a face in an image using a plurality of discriminations, the method comprising the steps of:
   setting a plurality of thresholds used for the plurality of discriminations, such that, as a face size of a detection target in an image is small smaller, the a higher threshold is set to reduce incorrect detection of an area that is not a face; and
   detecting a face in the image using the threshold set in the setting step and a sum of evaluation values calculated from an area corresponding to the face size of the detection target in the image using at least two discriminations of the plurality of discriminations,
   wherein the detecting step includes stopping detecting in the area based on a result of comparing (a) the sum of evaluation values and (b) at least one threshold of the plurality of thresholds set in the setting step.

7. A control program stored in a non-transitory computer-readable storage medium, the control program causing a computer to execute a process comprising:
   setting a plurality of thresholds used for a plurality of discriminations, such that, as a face size of a detection target in an image is smaller, a higher threshold is set to reduce incorrect detection of an area that is not a face;
   calculating a plurality of evaluation values from an area corresponding to the face size of the detection target in the image using the plurality of discriminations; and
   detecting a face in the image using the plurality of thresholds set in the setting step and the plurality of calculated evaluation values,
   wherein the detecting step includes stopping detecting in the area based on a result of comparing an evaluation value calculated by at least one discrimination of the plurality of the discriminations with at least one threshold of the plurality of thresholds set in the setting step.

8. A control program stored in a non-transitory computer-readable storage medium, the control program causing a computer to execute a process comprising:
   setting a a plurality of thresholds used for a plurality of discriminations, such that, as a face size of a detection target in an image is smaller, a higher threshold is set to reduce incorrect detection of an area that is not a face; and
   detecting a face in the image using the threshold set in the setting step and a sum of evaluation values calculated from an area corresponding to the face size of the detection target in the image using at least two discriminations of the plurality of discriminations,
   wherein the detecting step includes stopping detecting in the area based on a result of comparing (a) the sum of evaluation values and (b) at least one threshold of the plurality of thresholds set in the setting step.

* * * * *